US009323508B2

(12) United States Patent
Qi et al.

(10) Patent No.: US 9,323,508 B2
(45) Date of Patent: Apr. 26, 2016

(54) METHOD AND SYSTEM FOR COMPILER OPTIMIZATION

(71) Applicant: Marvell World Trade Ltd., St. Michael (BB)

(72) Inventors: Xinyu Qi, Shanghai (CN); Ningsheng Jian, Shanghai (CN); Haitao Huang, Shanghai (CN); Liping Gao, Shanghai (CN)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 14/338,450

(22) Filed: Jul. 23, 2014

(65) Prior Publication Data

US 2015/0033214 A1 Jan. 29, 2015

Related U.S. Application Data

(60) Provisional application No. 61/857,952, filed on Jul. 24, 2013.

(51) Int. Cl.
*G06F 9/45* (2006.01)
*G06F 9/455* (2006.01)

(52) U.S. Cl.
CPC ............... *G06F 8/443* (2013.01); *G06F 8/441* (2013.01); *G06F 9/4552* (2013.01)

(58) Field of Classification Search
USPC ........................................................ 717/152
See application file for complete search history.

(56) References Cited

U.S. PATENT DOCUMENTS

| 5,367,684 | A  | * | 11/1994 | Smith ............................ 717/140 |
| 5,854,933 | A  | * | 12/1998 | Chang ............................ 717/158 |
| 6,009,272 | A  | * | 12/1999 | Goebel .......................... 717/152 |
| 6,374,403 | B1 | * | 4/2002 | Darte et al. .................... 717/161 |
| 6,907,601 | B1 | * | 6/2005 | Hoflehner et al. ............. 717/151 |
| 7,624,388 | B2 | * | 11/2009 | Hsieh et al. .................... 717/154 |
| 7,725,885 | B1 | * | 5/2010 | Pradhan et al. ................ 717/148 |
| 8,479,183 | B2 | * | 7/2013 | Hsieh et al. .................... 717/154 |
| 2003/0079210 | A1 | * | 4/2003 | Markstein et al. ............. 717/152 |
| 2004/0216095 | A1 | * | 10/2004 | Wu .................................. 717/151 |
| 2005/0246697 | A1 | * | 11/2005 | Hsieh et al. .................... 717/151 |
| 2010/0050163 | A1 | * | 2/2010 | Hsieh et al. .................... 717/154 |
| 2011/0138372 | A1 | * | 6/2011 | Damron ......................... 717/154 |
| 2015/0033214 | A1 | * | 1/2015 | Qi et al. ......................... 717/151 |

OTHER PUBLICATIONS

International Search Report and Written Opinion issued Jan. 29, 2015 in PCT/IB2014/002374.
Yuan Zhang, et al., "Swift: A Register-based JIT compiler for Embedded JVMs" Proceedings of the 8th ACM SIGPLAN/SIGOPS Conference on Virtual Execution Environments, XP055162274, Mar. 3, 2012, pp. 63-73.

(Continued)

*Primary Examiner* — Marina Lee

(57) ABSTRACT

Aspects of the disclosure provide a method for code compilation. The method includes receiving instructions of a loop code for compiling, allocating one or more registers to variables before compiling the instructions into a loop body for the loop code, and compiling the instructions into the loop body based on the allocated registers.

19 Claims, 4 Drawing Sheets

(56) References Cited

OTHER PUBLICATIONS

Andreas Gal, et al., "HotpathVM: An Effective JIT Compiler for Resource-constrained Devices" ISBN: 978-1-59593-332-4, XP007902026, Jun. 14, 2006, pp. 144-153.

Michael Bebenita, et al., "SPUR: A Trace-Based JIT Compiler for CIL" Proceedings of the 2009 ACM SIGPLAN Conference on Programming Language Design and Implementation, vol. 45, No. 10, XP055150227, Oct. 17, 2010, pp. 708-725.

* cited by examiner

```
A1:   mul-float v6, v2, v2
A2:   add-float/2addr v6, v7
A3:   add-float/2addr v0, v6
A4:   add-float/2addr v2, v7
A5:   ...
A6:   cmpg-float v6, v2, v6
A7:   if-gez v6, (A1)
A8:   ...
```

METHOD AND SYSTEM FOR COMPILER OPTIMIZATION

INCORPORATION BY REFERENCE

This present disclosure claims the benefit of U.S. Provisional Application No. 61/857,952, "Type-based Early Stage Register Allocation Optimization Technology Applied to Multi Register Virtual Machine" filed on Jul. 24, 2013, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Generally, a JAVA virtual machine, such as Dalvik and the like, compiles frequently used JAVA bytecode into native code to improve runtime performance. In an example, the JAVA virtual machine includes a just-in-time compiler that compiles bytecode one by one and does register allocation at the same time.

SUMMARY

Aspects of the disclosure provide a method for code compilation. The method includes receiving instructions of a loop code for compiling, allocating one or more registers to variables before compiling the instructions into a loop body for the loop code, and compiling the instructions into the loop body based on the allocated registers.

In an embodiment, the loop code is in bytecode, and is compiled into native code. The method includes receiving the instructions of the loop code in bytecode for compiling, allocating one or more physical registers to virtual registers before compiling the instructions into the loop body in native code for the loop code in the bytecode, and compiling the instructions into the loop body in the native code based on the allocated physical registers. In an example, the method includes adding load instructions in a loop entry block before the loop body to load values in the virtual registers to the allocated physical registers. In another example, the method includes adding unload instructions in a loop exit block after the loop body to unload values in the allocated physical registers to the virtual registers.

Further, according to an aspect of the disclosure, the method includes determining whether available physical registers satisfy a compiling requirement of the instructions of the loop code. In an example, the method includes comparing a number of available physical registers with a pre-determined limit, and adding an allocation instruction in a loop entry block of the native code to be executed before the loop body when the number of available physical registers is larger than the pre-determined limit.

Aspects of the disclosure provide a non-transitory computer readable medium storing program instructions for causing a processor to execute operations for code compilation. The operations includes receiving instructions of a loop code for compiling, allocating one or more registers to variables before compiling the instructions into a loop body for the loop code, and compiling the instructions into the loop body based on the allocated registers.

Aspects of the disclosure provide an apparatus that includes a processor and a memory. The processor is configured to execute instruction codes. The memory is configured to store instructions for causing the processor to receive instructions of a loop code for compiling, allocate one or more registers to variables before compiling the instructions into a loop body for the loop code, and compile the instructions into the loop body based on the allocated registers.

BRIEF DESCRIPTION OF THE DRAWINGS

Various embodiments of this disclosure that are proposed as examples will be described in detail with reference to the following figures, wherein like numerals reference like elements, and wherein:

FIGS. 3A and 3B show code examples according to an embodiment of the disclosure.

DETAILED DESCRIPTION OF EMBODIMENTS

Figure 1:
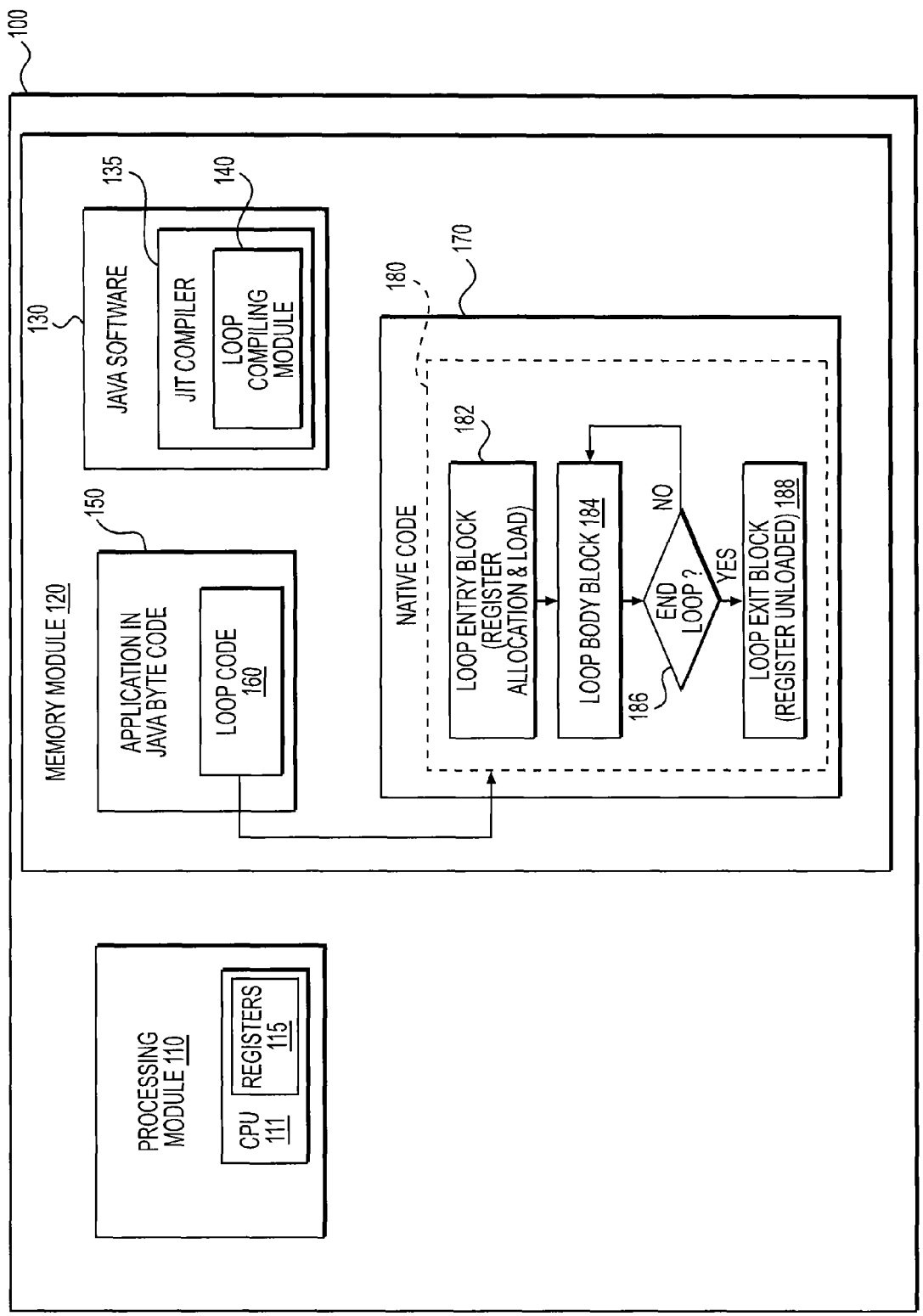
FIG. 1 shows a block diagram of a system example 100 according to an embodiment of the disclosure.

FIG. 1 shows a block diagram of a system example 100 according to an embodiment of the disclosure. The system 100 includes hardware components, such as a processing module 110, a memory module 120, and the like, and software components, such as various code instructions stored in the memory module 120. The hardware components operate according to the software components to perform various tasks. The system 100 uses a just-in-time (JIT) compiler 135 configured to perform a loop-scope register allocation for a loop before compiling instructions one by one in the loop.

The system 100 can be any suitably system, such as a desktop computer, a laptop computer, a tablet computer, a smart phone, and the like. The system 100 can include other suitable components (not shown), such as a display, a touchscreen, a microphone, a communication component, and the like. In an embodiment, the system 100 includes a single integrated circuit (IC) chip that integrates various circuits, such as the processing module 110, the memory module 120, and the like on the single IC chip. In another embodiment, the system 100 includes multiple IC chips, such as a processor chip, a memory chip and the like that are suitably coupled together.

The processing module 110 includes one or more processors, such as a central processing unit (CPU) 111, and the like, to execute various code instructions to perform various tasks. The code instructions can be low level code, such as machine code (native code), that can be directly executed by the CPU 111 or can be high level code, such as in JAVA language, in C language and the like, that can be translated into the machine code and then executed.

The CPU 111 can be implemented using any suitable architecture, such as x86, ARM, and the like. In an example, when the CPU 111 has the x86 architecture, the CPU 111 is able to execute machine code in a x86 instruction set that is specific for the x86 architecture. In another example, when the CPU 111 has the ARM architecture, the CPU 111 is able to execute machine codes in an ARM instruction set that is specific for the ARM architecture.

Generally, the CPU 111 includes a plurality of registers 115 (physical registers) that can be accessed with fast speed. Each instruction performs a specific task, such as a load, a jump, an arithmetic operation, a logic operation, and the like on data in the registers and/or the memory module 120. In an embodiment, the CPU 111 is configured to have a pipeline architecture, and the register-based instructions are generally time-efficient.

The memory module 120 includes one or more storage media that provide memory space for various storage needs. In an example, the memory module 120 stores code instructions to be executed by the processing module 110 and stores data to be processed by the processing module 110. In another example, the memory module 120 includes memory spaces allocated for system storage, and includes memory spaces allocated for user storage.

The storage media include, but are not limited to, hard disk drive, optical disc, solid state drive, read-only memory (ROM), dynamic random access memory (DRAM), static random access memory (SRAM), flash memory, and the like.

According to an aspect of the disclosure, the memory module 120 stores various computer programs, such as system programs, user application programs, and the like. Each computer program includes code instructions to be executed to perform a task.

In the FIG. 1 example, a memory space 130 is allocated in the memory module 120 to store a JAVA software program that is suitable for the system 100. The JAVA software program is installed in the system 100 to provide a JAVA runtime environment (JRE), such that JAVA bytecode can be executed in the system 100. In an example, the JAVA software program is executed to start a JAVA virtual machine in the system 100 for executing JAVA bytecode. In an example, the system 100 is an Android system, and the memory space 130 stores Dalvik software program for the Android system.

In an embodiment, source code of a user application program is generated in JAVA language. The source code is compiled to generate JAVA bytecode for the user application. The JAVA bytecode is executable by various JAVA virtual machines. In the FIG. 1 example, a memory space 150 is allocated to store JAVA bytecode for the user application. To execute the JAVA bytecode, the system 100 starts the JAVA virtual machine. In an example, the CPU 111 executes the JAVA software at the memory space 130 to start the JAVA virtual machine. The JAVA virtual machine provides a JAVA runtime environment for the JAVA bytecode. After the execution of the JAVA bytecode, the JAVA virtual machine is terminated in an example.

According to an aspect of the disclosure, the JAVA virtual machine uses interpretation and just-in-time (JIT) compilation for JAVA bytecode execution. In an example, the JAVA virtual machine detects frequently executed traces, such as paths, loops, and the like, in the JAVA bytecode, and executes the frequently executed traces in a different manner from the less frequently executed traces. The JAVA virtual machine tracks a number of executions for a trace. When the number of executions for the trace is less than a threshold (e.g., two), the JAVA virtual machine executes the trace by interpretation; and when the number of executions for the trace is equal or larger than the threshold, the JIT compiler 135 compiles the trace of JAVA bytecode into a trace of native code, and caches the trace of native code in the memory module 120. Generally, instructions in a loop are frequently executed, and the JIT compiler 135 compiles instructions in the loop into native code, and caches the native code.

In the FIG. 1 example, a memory space 170 is allocated as a JIT cache to cache the compiled native code. Then, for further executions of the trace, the JAVA virtual machine executes the cached native code stored at the memory space 170.

According to an aspect of the disclosure, the JIT compiler 135 includes a loop compiling module 140 configured to compile a loop into native code to accelerate virtual machine execution. In the FIG. 1 example, the JAVA bytecode includes loops, such as a loop code 160, and the like. The loop compiling module 140 causes the loop code 160 to be translated into a loop code 180 in the native code. The loop code 180 is executed by the JAVA virtual machine with an accelerated speed.

Generally, JAVA bytecode uses virtual registers that are not linked to physical registers. Thus, the JAVA bytecode can be executed in various systems, by various JAVA virtual machines. At the time the system 100 executes the JAVA bytecode, the physical registers 115 are allocated to the virtual registers, and the bytecode instructions that operate based on the virtual registers are translated into the native code instructions that operate based on the physical registers 115. In an example, an arithmetic instruction in bytecode can be translated into a combination of a register allocation/load instruction, an arithmetic instruction, and a register unload-instruction in native code.

In an embodiment, the loop compiling module 140 is configured to cause a loop-scope register allocation for one or more specific registers in the loop code 160 before compiling code instructions in the loop code 160. Thus, the register allocation for the specific registers are consistent across the loop code 160. In an example, the loop compiling module 140 is configured to add a single allocation/load instruction in the loop code 180 for each of the specific registers before a loop body in the loop code 180. The single allocation/load instruction is executed once during an execution of the loop code 180. Further, in an example, the loop compiling module 140 is configured to add a single unload-instruction for each of the specific registers after the loop body in the loop code 180. Thus, in an example, the unload-instruction is executed once during an execution of the loop code 180.

Specifically, in the FIG. 1 example, the loop code 180 has a loop entry block 182, a loop body block 184, a loop control block 186 and a loop exit block 188. The loop entry block 182 is at the beginning of the loop code 180. In an example, the loop compiling module 140 causes one or more register allocation/load instructions for the loop code 180 to be placed in the loop entry block 182.

The loop exit block 188 is at the end of the loop code 180. In an example, the loop compiling module 140 causes one or more register unload-instructions for the loop code 180 to be placed in the loop exit block 188.

The loop body block 186 includes the code instructions that operate based on the allocated registers. In an example, the loop compiling module 140 translates instructions in the loop code 160 one by one based on the allocated registers in the loop entry block 182, and the loop compiling module 140 does not need to separately add the register allocation/load instructions and unload-instructions at the time of each code instruction translation.

The loop control block 186 includes conditions to determine whether to repeat the loop body block 186 or to exit the loop code 180 through the loop exit block 188.

It is noted that the memory module 120 can have memory spaces allocated for other suitable module. In an example, a memory space (not shown) is allocated in the memory module 120 to store a program for a kernel. The kernel is a part of an operating system for the system 100 that interfaces user application programs with the hardware components of the system 100. For example, the kernel manages input/output requests from software components, such as the user application programs and the like, and translates them into data processing instructions for the hardware components, such as the processing module 110, the memory module 120 and the like.

Figure 2:
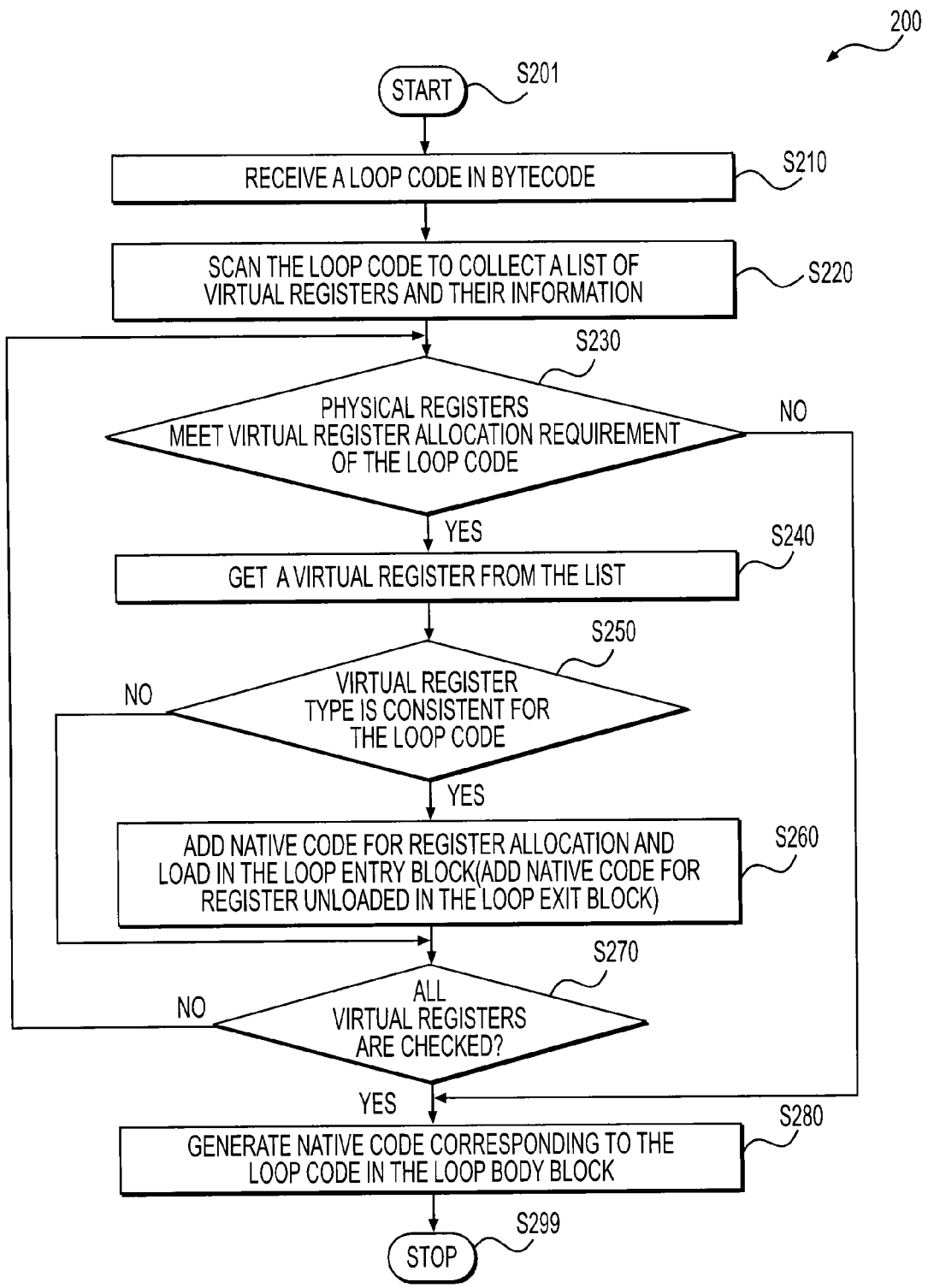
FIG. 2 shows a flow chart outlining a compilation process 200 according to an embodiment of the disclosure.

FIG. 2 shows a flow chart outlining a process example 200 according to an embodiment of the disclosure. In an example, an application program in JAVA language is translated into JAVA bytecode, and the JAVA bytecode is stored at the memory space 150 in the memory module 120 in the FIG. 1 example. In an embodiment, to execute the JAVA bytecode, the CPU 111 executes the JAVA software program stored at the memory space 130 to start the JAVA virtual machine. The JAVA virtual machine provides JAVA runtime environment for executing the JAVA bytecode. In an example, the JAVA virtual machine uses the JIT compiler 135 to compile a loop in JAVA bytecode into native code, and the JAVA virtual machine executes the compiled native code to improve performance. In the example, the CPU 111 executes the loop compiling module 140 to compile the loop code 160 in the JAVA bytecode into the loop code 180 in the native code according to the process 200. The process starts at S201 and proceeds to S210.

At S210, a loop code in bytecode is received. In the FIG. 1 example, the JAVA virtual machine receives the loop code 160 for execution. The loop code 160 includes a plurality of instructions in bytecode.

At S220, the loop code is scanned to collect a list of virtual registers, and the information of the virtual registers. In the FIG. 1 example, the loop code 160 is scanned to collect a list of virtual registers used in the loop code 160, and information of the virtual registers, such as the type of each virtual register, type consistency of the virtual register, and the like. In an example, the type information can be got from register usage and/or register definition in the loop code 160.

At S230, the process proceeds based on a determination whether the available physical registers meet virtual register allocation requirement of the loop code. In an example, a limit number of physical registers is pre-determined, or determined at S220 based on the scan of the loop code, according to an empirical formula. The limit number is indicative of the requirement for compiling success. The loop compiling module 140 compares the available physical registers (e.g., physical registers not being allocated) to the limit number. In an example, when the number of available physical registers in the system 100 is larger than the limit number, the loop compiling module 140 determines that the available physical registers meet the virtual register allocation requirement. When the available physical registers meet the virtual register allocation requirement, the process proceeds to S240; otherwise, the process proceeds to S280.

At S240, a virtual register is retrieved from the list. In an example, an unallocated virtual register in the list of virtual registers is identified.

At 250, the process proceeds based on a determination whether the virtual register has consistent type in the loop code. In the FIG. 1 example, the loop compiling module 140 determines whether the virtual register has consistent type in the loop code 160 based on the information of the registers collected in S220. When the virtual register has consistent type in the loop code 160, the process proceeds to S260; otherwise, the process proceeds to S270.

At S260, register allocation/load instruction for the virtual register is added in a loop entry block of the native code. In the FIG. 1 example, the loop compiling module 140 adds a register allocation/load instruction in the loop entry block 182 to allocate a physical register to the virtual register and load data in the virtual register to the allocated physical register. Further, in an embodiment, the loop compiling module 140 adds an unload-instruction in the loop exit block 188 to unload the data from the allocated physical register to the virtual register.

At S270, the process proceeds based on a determination whether all the virtual registers have been checked. In the FIG. 1 example, the loop compiling module 140 determines whether the virtual registers in the list have been checked for pre-allocation. When all the virtual registers have been checked for pre-allocation, the process proceeds to S280; otherwise, the process returns to S230 to determine whether the remaining available physical registers meet virtual register allocation requirement of the loop code.

At S280, the instructions in the loop code are compiled based on the register allocation to generate the native code. In the FIG. 1 example, the loop compiling module 140 then compiles the bytecode in the loop code 160 one by one based on the allocated registers. For example, when a virtual register in an instruction has been allocated and loaded by an instruction in the loop entry block 182, the loop compiling module 140 does not add separate register allocation/load instruction and unload instruction in the loop body 184 for the virtual register. However, when a virtual register in the instruction has not been allocated, for example, due to inconsistent type of the virtual register in the loop code 160, the loop compiling module 140 may add register allocation/load and unload instructions for the virtual register in the loop body 184. The process then proceeds to S280 and terminates.

Figure 3B:
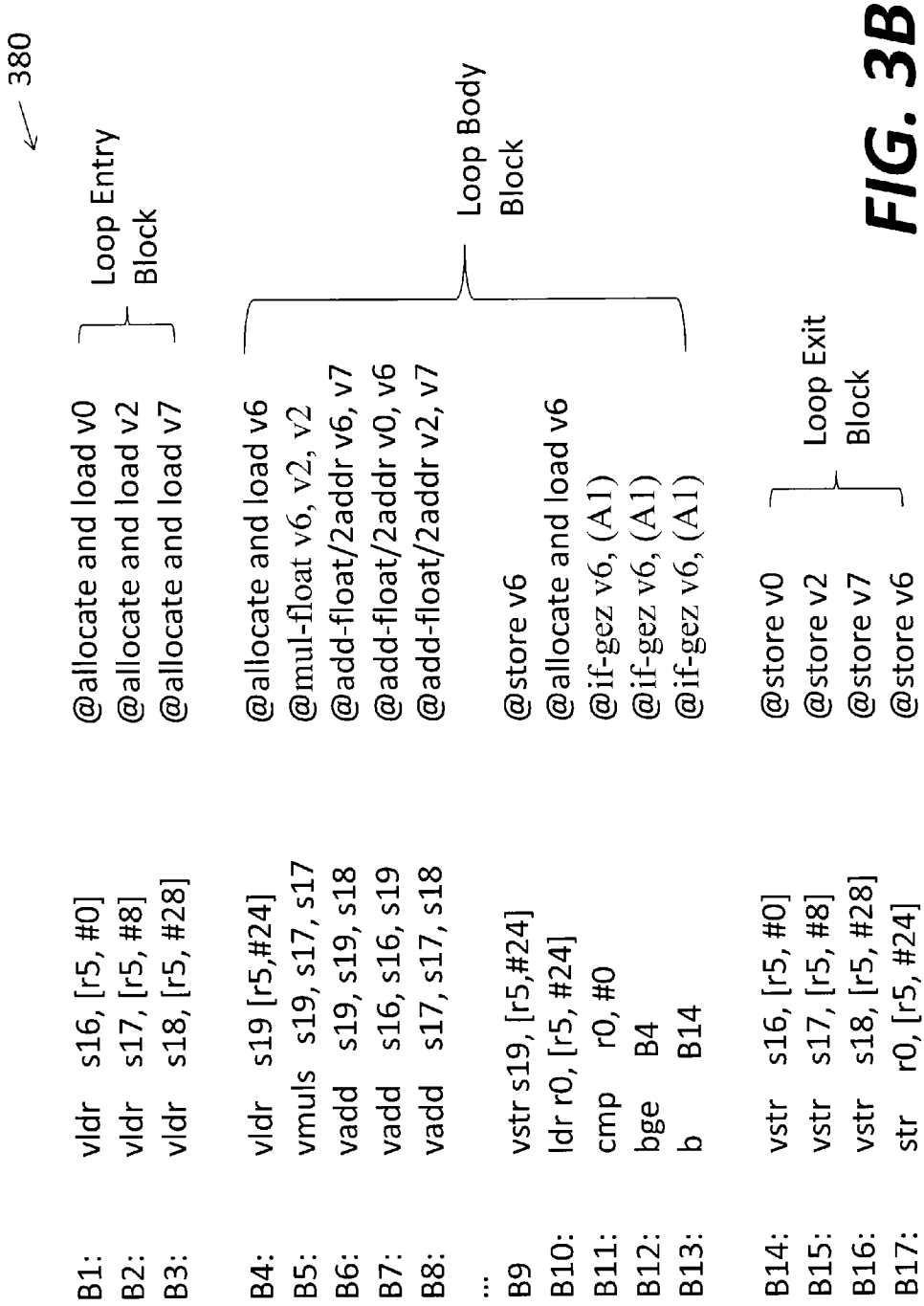

FIG. 3A shows a loop code 360 in bytecode for compilation and FIG. 3B shows the compiled loop code 380 in native code according to an embodiment of the disclosure.

In the FIG. 3A example, A1-A8 are addresses for the instructions in the loop code 360. In the loop code 360, instructions at A1-A4 are arithmetic instructions. The instruction at A6 is a comparison instruction and the instruction at A7 is a conditional jump instruction.

In the loop code 360, the virtual registers V0, V2 and V7 are of floating point type and are consistent across the loop code. The virtual register V6 is of floating point type at A1, A2 and A3, and changes to integer type at A6.

In the FIG. 3B example, B1-B17 are the addresses for the instructions in the loop code 380. The loop code 380 includes a loop entry block a loop body block and a loop exit block. In the loop entry block, instructions at B1-B3 respectively allocate physical registers to the virtual registers V0, V2 and V7, and load values in the virtual registers V0, V2 and V7 to the allocated physical registers. In the loop exit block, instructions at B14-B16 respectively unload the values in the allocated physical registers to the virtual registers V0, V2 and V7.

Because the type of virtual register V6 changes in the loop code 360, the allocation/load instructions and the un-load instructions for the virtual register V6 stay in the loop body block.

According to an aspect of the disclosure, because the allocation/load instructions, and the unload instructions for the virtual registers V0, V2 and V7 are out of the loop body block, the allocation/load instructions, and the unload instructions for the virtual registers V0, V2 and V7 are executed once during the execution of the loop code 380.

In a comparison example, the allocation/load instructions, and the unload instructions for the virtual registers V0, V2 and V7 are in the loop body block, and are repetitively executed in each loop iteration. Thus, during operation, the comparison example requires more clock cycles than the loop code 380.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method executed by a processor for code compilation, comprising:
   receiving instructions of a loop code in bytecode for compiling;
   scanning the loop code to collect a list of virtual registers;
   allocating one or more physical registers to the virtual registers before compiling the instructions into a loop body to generate native code for the loop code in the bytecode;
   compiling the instructions into the loop body to generate the native code based on the allocated physical registers; and
   adding an allocation instruction in a loop entry block of the native code to be executed before the loop body when a number of available physical registers that satisfy a compiling requirement of the instructions of the loop code is larger than a pre-determined limit.

2. The method of claim 1, further comprising:
   scanning the instructions of the loop code to collect information of the virtual registers.

3. The method of claim 1, further comprising:
   adding load instructions in a loop entry block before the loop body to load values in the virtual registers to the allocated physical registers.

4. The method of claim 1, further comprising:
   adding unload instructions in a loop exit block after the loop body to unload values in the allocated physical registers to the virtual registers.

5. The method of claim 1, further comprising:
   determining whether available physical registers satisfy the compiling requirement of the instructions of the loop code.

6. The method of claim 5, wherein determining whether the available physical registers satisfy the compiling requirement of the instructions of the loop code before each allocation further comprises:
   comparing the number of available physical registers with the pre-determined limit.

7. A non-transitory computer readable medium storing program instructions for causing a processor to execute operations for code compilation, the operations comprising:
   receiving instructions of a loop code in bytecode for compiling;
   scanning the loop code to collect a list of virtual registers;
   allocating one or more physical registers to the virtual registers before compiling the instructions into a loop body to generate native code for the loop code in the bytecode;
   compiling the instructions into the loop body to generate the native code based on the allocated physical registers; and
   adding an allocation instruction in a loop entry block of the native code to be executed before the loop body when a number of available physical registers that satisfy a compiling requirement of the instructions of the loop code is larger than a pre-determined limit.

8. The non-transitory computer readable medium of claim 7, wherein the operations further comprise:
   scanning the instructions of the loop code to collect information of the virtual registers.

9. The non-transitory computer readable medium of claim 7, wherein the operations further comprise:
   adding load instructions in a loop entry block before the loop body to load values in the virtual registers to the allocated physical registers.

10. The non-transitory computer readable medium of claim 7, wherein the operations further comprise:
    adding unload instructions in a loop exit block after the loop body to unload values in the allocated physical registers to the virtual registers.

11. The non-transitory computer readable medium of claim 7, wherein the operations further comprise:
    determining whether available physical registers satisfy the compiling requirement of the instructions of the loop code.

12. The non-transitory computer readable medium of claim 11, wherein the operations further comprise:
    comparing the number of available physical registers with the pre-determined limit.

13. An apparatus, comprising:
    a processor configured to execute instruction codes; and
    a memory configured to store instructions for causing the processor to:
    receive instructions of a loop code in bytecode for compiling;
    scan the loop code to collect a list of virtual registers;
    allocate one or more physical registers to the virtual registers before compiling the instructions into a loop body to generate native code for the loop code in the bytecode;
    compile the instructions into the loop body to generate native code based on the allocated physical registers; and
    add an allocation instruction in a loop entry block of the native code to be executed before the loop body when a number of available physical registers that satisfy a compiling requirement of the instructions of the loop code is larger than a pre-determined limit.

14. The apparatus of claim 13, wherein the memory is configured to store the instructions for causing the processor to:
    scan the instructions of the loop code to collect information of the virtual registers.

15. The apparatus of claim 13, wherein the memory is configured to store the instructions for causing the processor to:
    add load-instructions in a loop entry block before the loop body to load values in the virtual registers to the allocated physical registers.

16. The apparatus of claim 13, wherein the memory is configured to store the instructions for causing the processor to:
    add unload-instructions in a loop exit block after the loop body to unload values in the allocated physical registers to the virtual registers.

17. The apparatus of claim 13, wherein the memory is configured to store the instructions for causing the processor to:
    determine whether available physical registers satisfy the compiling requirement of the instructions of the loop code.

18. The apparatus of claim 17, wherein the memory is configured to store the instructions for causing the processor to:
    compare the number of available physical registers with the pre-determined limit.

19. The apparatus of claim 13, wherein the loop body is a portion of the memory where the instructions compiled in the native code is stored.

* * * * *